United States Patent

[11] 3,629,499

[72] Inventor Allan Ivan Carlson
Ossining, N.Y.
[21] Appl. No. 838,445
[22] Filed July 2, 1969
[45] Patented Dec. 21, 1971
[73] Assignee U.S. Philips Corporation
New York, N.Y.

[54] PATTERN NOISE REDUCTION SYSTEM
8 Claims, 1 Drawing Fig.

[52] U.S. Cl. .......... 178/7.2 R, 178/DIG. 8, 178/DIG. 12, 178/DIG. 26, 250/83.3 HP, 315/10
[51] Int. Cl. .......... H04n 5/38
[50] Field of Search .......... 178/DIG. 8, DIG. 12, DIG. 26, 7.2 AR; 315/10, 11; 250/83.3 HP, 83.3 H, 207

[56] References Cited

UNITED STATES PATENTS

| | | | |
|---|---|---|---|
| 2,816,954 | 12/1957 | Huffman | 178/6 |
| 2,839,699 | 6/1958 | Szegho et al. | 315/10 |
| 2,853,648 | 9/1958 | Theile | 315/11 |
| 2,920,137 | 1/1960 | Garbuny | 178/6 |
| 2,969,477 | 1/1961 | Gebel | 315/11 |
| 3,067,283 | 12/1962 | Petritz et al. | 178/6 |

*Primary Examiner*—Richard Murray
*Assistant Examiner*—P. M. Pecori
*Attorney*—Frank R. Trifari

ABSTRACT: This invention relates to an apparatus and methods for reducing pattern noise in a vidicon type camera tube and particularly a vidicon camera tube system embodying a thermal detector array for viewing infrared radiation. A chopper is placed in front of the detector and switched open and shut. Thus, the vidicon target receives alternatively signal plus noise and noise alone. When receiving the noise alone, the target is overcharged above a bias level by an external source to an amount equal to the discharge due to the noise. Therefore, when the target receives signal plus noise, the noise components will subtract out.

PATENTED DEC 21 1971 3,629,499
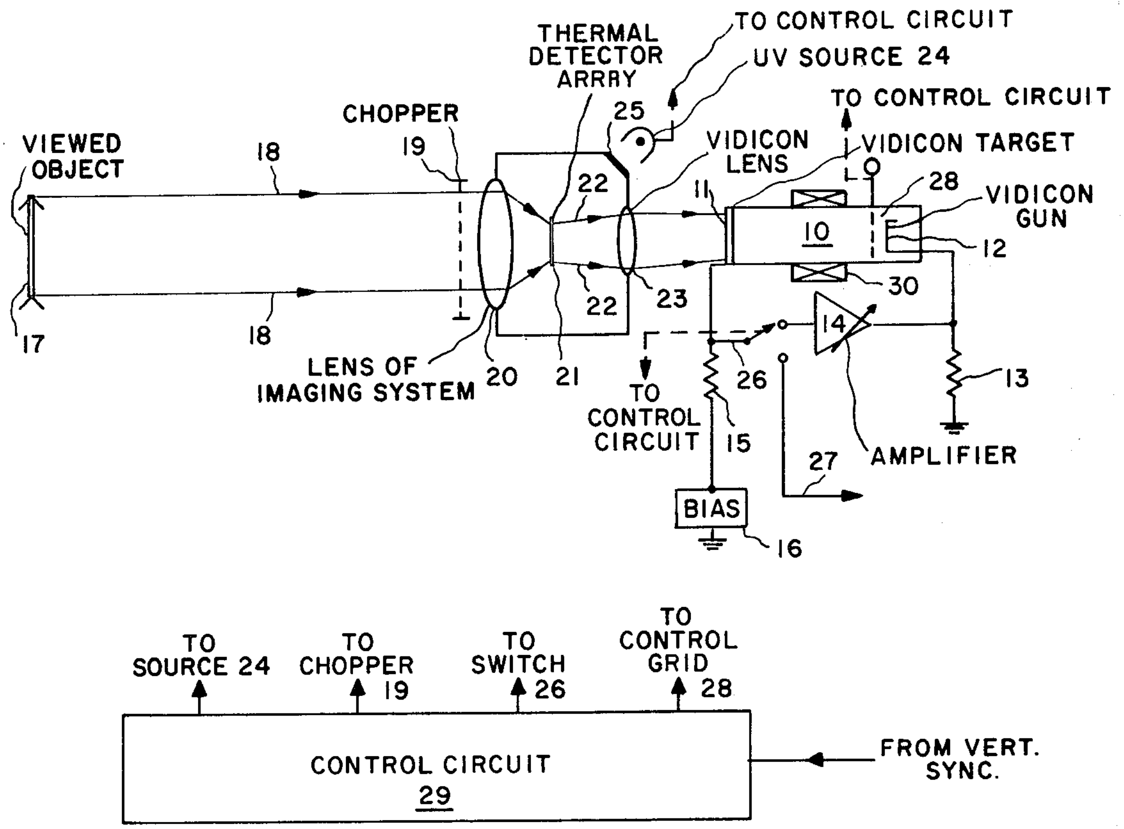
INVENTOR.
ALLAN I. CARLSON
BY
AGENT

PATTERN NOISE REDUCTION SYSTEM

This invention relates to apparatus and methods for reducing pattern (spatial) noise in a vidicon type camera tube system and more particularly in a vidicon type tube system embodying an infrared thermal detecting array.

In the construction of a television camera tube that is sensitive to infrared radiation, a common apparatus uses an infrared sensitive phosphor as a thermal detector. This detector is located in front of the vidicon to receive the infrared radiation. It then reradiates the information contained in the infrared energy to the vidicon target as amplitude variations visible light, to which the vidicon target is sensitive. A problem with this apparatus is that the thermal detector is extremely noisy. The vidicon target is also noisy, but less so than the thermal detector array. This results in a spatially uneven potential across the vidicon target called "pattern noise." This pattern noise is troublesome because it is large with respect to the modulation depth of the incoming infrared radiation.

It is therefore an object of this invention to reduce pattern noise in a television camera.

It is another object to reduce pattern noise in vidicon type television cameras and thermal detector arrays which view infrared light.

In brief, these and other objects are achieved by biasing a vidicon target and thereafter illuminating the target with the dark light from a thermal detector, causing the target to partially discharge. An electron scanning beam then recharges each point of the target to a value above the original bias level equal to the initial discharge amount caused by the radiation from the thermal detector. The target is then illuminated by the exposed thermal detector which discharges the target by an amount proportional to the intensity of the light from the viewed object plus the dark light. Thus the pattern noise from the dark light will cancel out.

Other objects and advantages will become apparent from the following description taken in conjunction with the accompanying drawing in which:

The FIGURE is a schematic diagram illustrating a preferred embodiment of the invention.

The FIGURE shows a vidicon type camera tube 10 having an anode target 11 sensitive to visible light and a cathode-ray emitting electron gun 12 disposed at opposite ends thereof. The target 11 may be either a standard vidicon target such as shown for example in the RCA Review, Sept. 1951, pages 306 to 313, or a diode matrix-type mesh, described for example in the Bell System Technical Journal, vol. 46, No. 2, pages 491 to 495. The vidicon 10 also includes horizontal and vertical deflection systems of conventional construction located near the gun 12, so that the electron beam from the gun 12 can scan the target 11, and beam accelerating electrodes, but these have been omitted for the sake of clarity. The control grid 28, can turn on and off the electron beam and is driven from the control circuit 29. The vidicon is shown with focusing coil 30, but electrostatic focusing could also be used. Coupled to the cathode of the gun 12 is a cathode resistor 13 serving as the load impedance of an amplifier 14. Coupled to the target 11 is a load resistor 15 through which a bias voltage of about +45 volts is supplied to the target 11 from a supply 16. By means of a switch 26, the output signal voltage of the vidicon 10 appearing across the resistor 15 can be connected to a signal output circuit 27 or to the input of the amplifier 14. Though shown as a mechanical switch in the figure, the switch 26 is actually an electronic switch because of the switching times involved and its operation is synchronized by the control circuit 29 with the scanning of the target 11 as will hereinafter be more fully described.

In all vidicon type camera tubes in which the image target is a layer or coating of a semiconductive material, light impinging upon the target 11 causes the target surface exposed to the scanning beam to discharge. A signal applied to the input of amplifier 14 coupled to the target 11, causes a varying current to flow from the gun 12 to target 11. Thus the beam charges each point of the inner surface of target 11 to a potential above or below the steady state bias level by an amount equal to departures of the cathode potential from its nominal value as determined by the voltage changes across load resistor 15. When pattern noise exists the points of the surface of target 11 are normally discharged, and the inverse of this discharge pattern may be generated on the target surface by appropriately varying the cathode potential by connecting the cathode resistor 13 to the load resistor 15 through the amplifier 14.

An object 17 to be viewed at infrared wavelengths is shown disposed axially with respect to the vidicon 10. Infrared radiation 18 from the object 17 passes through a chopper 19, which intermittently interrupts the radiation received by a thermal detector array 21. Such detectors are known from U.S. Pat. Nos. 2,642,538 and 3,114,836 and also Hilsom et al., Infrared Physics, Vol. I, page 67, (1961); McDaniel et al., Applied Optics, Vol. I, page 311, (1962). The control circuit 29 controls the chopper 19 such that the chopper is open when switch 26 is in the lower, "output," position. The incident radiation is focused on the surface of the detector 21 by a lens 20. The detector 21 may be of well-known form operating on the principles of optical absorption, luminescence, color reflection, etc. In the present embodiment the detector 21 comprises an infrared sensitive phosphor which is excited by an ultraviolet source 24 radiating through a window 25, and reradiates the object image as a shorter wavelength image i.e., a visible image, in accordance with the impinging infrared image. The reradiated image, shown as the modulated visible light rays 22, is focused by a lens 23 onto the target 11 of the tube 10. Assuming that the target 11 has been charged to the steady state value of the bias supply 16, the impinging image, shown by the rays 22, will partially discharge each point of the target 11 in accordance with the intensity distribution of the impinging image.

In the initial operation the chopper 19 is closed, blocking the rays 18 from impinging upon the thermal detector 21; and the ultraviolet source 24 is on, exciting the phosphor of the detector to emit visible light. From the previous cycle of operation (to be described below), the bias supply 16 and the electron beam charged each point of the target 11 to approximately +45 volts. In the present cycle, the visible light radiation causes photoconduction within the target 11, whereby the inner surface of target 11 will discharge in accordance with the intensity of the visible light 22. Since the visible light 22 is spatially uneven, each point of the inner surface of the target 11 will discharge to a slightly different value. If, for example, visible light impinging upon a particular point of the target causes a discharge of 5 volts, that point of the target 11 will discharge to approximately 40 volts; the exact value depends upon the intensity of the light impinging on the particular point on the target in question. This variation in the light as a function of lateral coordinates is the noise to be cancelled and gives it its name: pattern or spatial noise.

With the chopper 19 still closed, the ultraviolet source 24 is turned off, and thus the phosphor of the detector 21 is no longer excited and no light impinges upon the target 11. The electron beam from the gun 12 now is turned on and is scanned across each point of the inner surface of target 11 charging said points to a value as described below. The switch 26 is in its upper position coupling the signals from the target 11 to the electron gun 12. The amplifier 14 successively receives signals corresponding to the change in potential of each point of the inner surface of target 11. The gain of amplifier 14 is adjusted such that each point on the target 11 is brought above the bias level (45 volts) by the current in the electron beam by an amount equal to the extent to which it was discharged by the pattern noise. Thus, if a particular point was discharged to 40 volts from the bias level of 45 volts by the pattern noise, the current of the scanning electron beam under the control of the amplifier 14 charges that point to 50 volts. The adjustment may be accomplished by viewing the scene of a monitor (not shown) coupled to the output 27 while adjusting the gain of the amplifier 14 to minimize the observed noise.

Thereafter, the electron beam is again cut off; the ultraviolet source is turned on, exciting the phosphor of the detector 21; and the chopper 19 is opened, permitting the infrared image to impinge upon the detector 21. The infrared image 18 from the object 17 now passes through the chopper 19 and is focused by the lens 20 onto the detector 21. The detector 21 emits a visible light image 22 corresponding to the infrared image; the visible image is, in turn, focused onto the target 11 by the lens 23. The visible light emitted by the detector 21 will consist of two components: a first component containing the information in the infrared signal from the object 17 and a second component containing the inherent pattern noise from the detector 21. It was assumed before that the noise at a particular point corresponded to a discharge of the target 11 of 5 volts; assume now that the desired signal at that same particular point causes a discharge of 1 volt. Thus, the total discharge is 6 volts. Therefore, the inner surface of target 11, which was charged to 50 volts by amplifier 14 and the electron beam, will discharge from 50 volts to 44 volts. The chopper 19 now closes, interrupting the infrared image 18 from reaching the detector 21; the ultraviolet source 24 is turned off, so that the phosphor of the detector 21 is no longer excited; and the switch 17 is changed to its lower position coupling the output 27 to the target 11. The electron beam is turned on and swept across the inner surface of target 11. Since the amplifier 14 is disabled, the beam current simply charges all the points of the inner surface of target 11 to the potential of the gun 12. At the point in the example a signal output current generated by 45—44=1 volt at the output 27 is obtained free from a spatial noise current, which would be, without the present invention, generated by the noise potential of 5 volts. It will be appreciated that the particular signal and noise voltages vary with the particular point on the target, and that whatever their value the noise voltage cancels out in the output circuit 27. Since all points of the target 11 are now at a potential difference of 45 volts, which was the initial assumed condition, the apparatus is in a state suitable to begin the cycle of operation anew.

The control circuit 29 can be operated from any of a number of sources, but one convenient source is the vertical synchronization signal which is generated by the scanning circuitry (not shown) coupled to the deflection electrodes of the vidicon. The chopper 19 must be opened at the end of every other scan and closed at the end of the intermediate scans. Since the vertical sync pulse occurs at the end of every scanning interval, it can be coupled to a bistable multivibrator which in turn has one output coupled to the control terminal of a first gate in series with a chopper shutoff bias voltage. Thus, every other scan the bistable circuit will be in a state giving an output pulse, which will close the gate, which in turn closes the chopper. The intermediate vertical sync pulses will trigger the bistable circuit to its alternate state, thus opening the chopper. Since the switch 26 must be in synchronization with the chopper, it also can be operated from the same bistable circuit which can control a second gate coupled to the switch. A signal must be supplied to the control grid 28 of the vidicon to unblank the gun 12, and similarly the ultraviolet source 24 normally on must be shutoff during each scan of the target 11 by a control signal from the circuit 29. To achieve this, the vertical sync pulse from the end of the previous scan with respect to the scan in question can be delayed by a delay means such as a delay line or monostable multivibrator having a proper cycle time. Third and fourth gates coupled to the ultraviolet source 24 and the control grid 28, respectively, can have their control terminals coupled to the output of the delay means. Thus, the ultraviolet source 24 and the gun 12 will be off and unblanked, respectively, during each scanning interval.

If the frame time (the time that chopper 19 is open) is much greater than the scan time of the electron beam, then the pattern noise will not change appreciatively during the scanning. Therefore, the ultraviolet source 24 can be continuously left on.

The invention, as described above, also eliminates pattern noise generated within the target 11 itself. If the vidicon is used to view visible light, then neither the thermal detector array 21 nor ultraviolet source 24 are needed. The chopper 19 is then simply placed directly in front of the target 11. The adjustment and operation is otherwise as described above.

Instead of electrically controlling the ultraviolet source, optical control can be used. A second chopper synchronized with the first chopper 19 can be placed between the ultraviolet source 24 and window 25, or between the lens 23 and the vidicon tube 10. Although the word "point" is used in this description and the following claims, it is to be understood that it is not used in the mathematical sense, but in a practical sense as a "resolution element," i.e., the smallest area that can be resolved in practice.

What I claim is:

1. An apparatus for reducing spatial noise in a camera system operated from a bias supply to receive radiation emitted from an object comprising:
 a vidicon tube having a target coupled to the bias supply and disposed to receive the object radiation to discharge each point of said target, and a scanning election gun for charging each point of said target;
 means for interrupting the object radiation incident upon said target, and
 means for cancelling noise due to a spatially uneven potential across the target including means for setting the potential of each point of said target to a value corresponding to a negative of said pattern noise of the point when said object radiation is blocked.

2. An apparatus as defined in claim 1 wherein said setting means comprises an amplifier having an output coupled to said gun and an input coupled to said target when said object radiation is interrupted.

3. An apparatus as defined in claim 1 wherein said interrupting means comprises a chopper.

4. An apparatus as defined in claim 1 further comprising means for converting object radiation to visible light disposed between said interrupting means and said target.

5. An apparatus as defined in claim 4 wherein said converting means comprises a thermal detector array, an energy source for exciting said array, and means for turning on said source synchronized with said interrupting means.

6. An apparatus as defined in claim 5 wherein said thermal detector array is an infrared sensitive phosphor.

7. An apparatus as defined in claim 5 wherein said energy source is an ultraviolet source illuminating said thermal detector array.

8. The method of reducing spatial noise in a camera tube comprising:
 biasing a target from a bias supply:
 illuminating said target from a thermal detector array whereby each point of said target will discharge by an amount corresponding to the radiation impinging upon the point from said detector;
 scanning said target with an electron beam to charge each point of said target over said bias level by an amount equal to said previous discharge for the point;
 illuminating said target and detector with radiation from a desired viewed object whereby said target will discharge; and
 scanning said target with an electron beam at a potential equal to said bias level whereby said target will charge up to said bias level, the charging current flowing being a signal proportional to said viewed object without spatial noise from said thermal detector array.

* * * * *